United States Patent Office 2,857,315
Patented Oct. 21, 1958

2,857,315

PROPYLENE GLYCOL SOAP GEL STICK ANTI-PERSPIRANT

W Kedzie Teller, Riverside, Ill., assignor to Pharma-Craft Corporation, a corporation of Delaware No Drawing. Application August 8, 1955
Serial No. 527,161

2 Claims. (Cl. 167—90)

This invention relates to a perspiration inhibiting material and more particularly to such material in the form of a propylene glycol gel stick which includes sodium zirconium lactate as the perspiration inhibiting substance.

Gel sticks comprising propylene glycol and sodium stearate have heretofore been known for various cosmetic purposes. These sticks are stable at normal atmospheric temperature ranges within certain known proportions of sodium stearate and propylene glycol with or without additional material such as alcohol. On contact with the skin they have a pleasant effect and do not leave a waxy residue.

The sodium stearate in these sticks, however, is extremely sensitive to chemical reaction and the presence of a metal ion in a form free to react with the sodium stearate to produce another metallic stearate will render the stick unstable, or the material unable to form a stick.

Sodium zirconium lactate will react readily with sodium stearate to form a zirconium stearate, but I have found that no such reaction occurs within the proportions suitable for the formation of a propylene glycol-sodium stearate gel stick. This is true whether the gel be formed entirely of propylene glycol or whether alcohol such as ethyl alcohol, isopropyl alcohol, or the like, also be added. If the amount of alcohol substantially exceeds the amount of propylene glycol by weight, the gel stick is normally considered as an alcohol soap gel stick rather than a propylene glycol soap gel stick. In this connection reference is made to my copending application Serial No. 520,094 (Pat. No. 2,732,327) filed July 5, 1955, in which I have disclosed and claimed an alcohol soap gel stick including sodium stearate and sodium zirconium lactate. It is intended to draw a division between the claims of that case and the claims of this case in that an alcoholic soap gel stick is one in which the gel forming characteristics are due to the alcohol and not to any minor proportions of other ingredients, whereas in this case the claims are intended to cover soap gel sticks in which the gelling characteristics are due to the propylene glycol essentially, and not to any alcohol which may be incidentally present.

Sodium zirconium lactate is available in the market in the form of a 43% solution in water. Tests on such solution reveal that it has a pH of 7.55. Tests performed on a series of samples of such solution progressively diluted with water show progressively increasing acidity. For example, one part (by volume) of such 43% solution diluted with one part of water has a pH of 7.15 and with ten parts of water a pH of 6.75. With twenty parts of water the solution has a pH of 6.45. With one hundred parts of water the solution has a pH of 6.15 and with one thousand parts of water a pH of 5.80. The gradually increasing acidity upon dilution would further suggest that this substance is incompatible with soap and from this it might logically be concluded that it would be incompatible with a soap gel of the type hereinabove described. Nevertheless, it has been discovered that in the practice of the present invention no harmful incompatibility is exhibited either upon mixing of the ingredients or after substantial periods of time.

It is recognized, of course, that the term "sodium stearate" is used commercially to apply to the sodium salt of a mixture of fatty acids of which stearic acid and palmitic acid predominate with relatively small proportions of closely related fatty acids. The term is used here in its commercial sense. The alcohol referred to is absolute alcohol and preferably is an ethyl alcohol or isopropyl alcohol.

In the practice of the present invention a typical soap gel may be formed and melted and a useful quantity of sodium zirconium lactate in aqueous solution may then be stirred into the melted gel. The resulting product, upon cooling, is stable when stored in a closed container and at normal room temperature. Also, as set forth hereinbelow in a preferred example, the typical ingredients for a soap gel may be mixed together at an elevated temperature and useful quantities of an aqueous solution of sodium zirconium lactate may thereafter be distributed therein. Upon cooling the soap gel will solidify apparently without any adverse effects flowing from the presence of the sodium zirconium lactate. The resulting product is similarly stable. Also the composition may have incorporated therein moisture retaining substances and perfumes. Furthermore, in accordance with another preferred example set forth hereinbelow, a composition may be prepared with a soap gel and sodium zirconium lactate in useful quantities to serve as anti-perspirant and in addition, there may be incorporated recognized deodorant materials, for example a dihydroxy halogenated diphenyl methane, such as the widely used hexachlorophene. The resultant stick-type product is similarly stable and exhibits unusual qualities for the reduction in quantity of perspiration as well as preventing the development of odor.

The relative proportions between quantities of soap, propylene glycol, alcohol and water, if the latter is used, are merely so chosen so as to provide a final stick product having firmness and cooling effect within relatively wide ranges of personal preference. The specified quantities of optional additives such as perfumes, deodorant materials or moisture retention agents of which Carbitol (diethyleneglycol ethylether) is an example, although preferred for practical reasons and suitable for the particular materials named, are not critical to the present invention.

In the following examples typical useful quantities of sodium zirconium lactate will be set forth. It is believed that the range of quantity in which this substance may be added is limited only by practicality. That is to say, if only one-half part by weight per hundred of the final product consists of a 43% solution of sodium zirconium lactate, the anti-perspirant qualities would be very slight. However, useful anti-perspirant qualities are exhibited with as little as two parts per hundred and an exceedingly effective product is achieved by the use of about ten parts per hundred. Increase in quantity above ten parts per hundred to about twenty parts per hundred does not sensibly increase the desired anti-perspirant effect although it should be stated that such larger quantities bring about no unfavorable reaction upon the stability of the end product. Accordingly, in the claims the quantity of sodium zirconium lactate will not necessarily be stated in terms of precise proportions.

A suitable proportion of propylene glycol is 75 parts by weight to 7.5 parts by weight of sodium stearate, 1.5 parts by weight of Carbitol, 14 parts by weight of water, 10 parts by weight of sodium zirconium lactate solution (43.95% solids), .06% by weight of perfume and .25% by weight of hexachlorophene.

In another example one-half of the propylene glycol is replaced by 95% ethyl alcohol with the proportions of the other ingredients remaining the same.

The propylene glycol, hexachlorophene, Carbitol and sodium stearate may be mixed together with water and/or alcohol if these are used, heated to about 70° C. and maintained at 70° C. until the sodium stearate is completely dissolved. The sodium zirconium lactate solution may then be added and thoroughly mixed. The perfume is added just before pouring into molds. The final mixture is poured at a temperature of from 65° C. to 67° C. into cold (room temperature) molds. Preferably the molds are of size and shape to form a plurality of individual sticks which may be removed from the molds when cooled and packaged for sale. For example, the individual sticks may be cylindrical in form and of a size suitable for convenient use.

In any event the product of the present example will harden upon cooling slightly below the pouring temperature due to solidification of the soap gel base. The finished product is stable and needs only to be packaged in an air-tight fashion to prevent evaporation of the alcohol and water to have adequate shelf life for normal channels of distribution. The finished product has been subjected to extensive tests which amply demonstrate highly desirable anti-perspirant and deodorant qualities.

The order of addition of ingredients in the examples may be varied without apparent effect on the final product. Optional ingredients such as moisture retention agents, deodorants and perfumes may be added in any order, although it is obviously desirous for economic reasons to add the perfume just before pouring.

The foregoing detailed description has been given for clearness of understanding only, and no unnecessary limitations should be understood therefrom, as modifications will be obvious to those skilled in the art.

I claim:

1. A stable anti-perspirant stick having a base comprising a sodium stearate-propylene glycol soap gel and having dispersed therein within said base as an active anti-perspirant agent sodium zirconium lactate.

2. An anti-perspirant stick as set forth in claim 1 in which the sodium stearate-propylene glycol soap gel contains alcohol in an amount not substantially greater than the propylene glycol by weight.

References Cited in the file of this patent

UNITED STATES PATENTS

| | | |
|---|---|---|
| 1,984,733 | Forbing | Dec. 18, 1934 |
| 2,732,327 | Teller | Jan. 24, 1956 |